US00RE42816E

(19) United States
(12) Reissued Patent
Hu

(10) Patent Number: US RE42,816 E
(45) Date of Reissued Patent: Oct. 11, 2011

(54) DUAL FUNCTION RETAINER FOR A RATCHETING WRENCH

(76) Inventor: Bobby Hu, Taichung (TW)

(21) Appl. No.: 11/478,544

(22) Filed: Jun. 29, 2006

Related U.S. Patent Documents

Reissue of:
(64) Patent No.: 6,860,175
Issued: Mar. 1, 2005
Appl. No.: 10/647,692
PCT Filed: Aug. 25, 2003

(30) Foreign Application Priority Data

Oct. 3, 2002 (TW) ..... 91123053 A

(51) Int. Cl.
*B28B 13/00* (2006.01)
*B25B 13/46* (2006.01)

(52) U.S. Cl. ..... 81/63.2; 81/58.1; 81/63.1

(58) Field of Classification Search ..... 81/63.2, 81/63.1, 58.1, 58, 60, 61, 62, 63
See application file for complete search history.

(56) References Cited

U.S. PATENT DOCUMENTS 3,877,268 A * 4/1975 Shull ..... 70/492
3,881,376 A * 5/1975 Wright ..... 81/63
4,991,468 A * 2/1991 Lee ..... 81/60
6,065,374 A * 5/2000 Taggart ..... 81/63.2
6,216,563 B1 * 4/2001 Hsieh ..... 81/63.2
6,666,112 B2 * 12/2003 Hu ..... 81/63.1
6,688,195 B1 * 2/2004 Hsien ..... 81/60
6,971,286 B2 * 12/2005 Hu ..... 81/63.2
7,032,478 B2 * 4/2006 Hu ..... 81/63.2
7,178,429 B2 * 2/2007 Lin ..... 81/60
7,284,464 B2 * 10/2007 Chaconas ..... 81/63
2002/0166416 A1 * 11/2002 Hu ..... 81/63.2

* cited by examiner

*Primary Examiner* — Alvin J. Grant

(74) *Attorney, Agent, or Firm* — Alan Kamrath; Kamrath & Associates PA

(57) ABSTRACT

A ratcheting wrench includes a handle, a head extending from an end of the handle and having a hole communicated with a compartment in the end of the handle, a drive member rotatably mounted in the hole of the head, and a ratcheting mechanism. The drive member includes an inner periphery for securely holding a fastener-driving member, allowing joint rotation when the drive member is turned. A retainer is mounted around the end of the drive member and has two resilient portions extending into the hole of the drive member via the slots for rotatably holding the drive member in the hole of the head and for securely, releasably holding the fastener-driving member in the hole of the drive member.

23 Claims, 10 Drawing Sheets

DUAL FUNCTION RETAINER FOR A RATCHETING WRENCH

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a dual function retainer for a ratcheting wrench of the type receiving a fastener-driving member therein for driving a fastener such as a screw, bolt, or nut.

2. Description of the Related Art

Ratcheting wrenches have been widely used for tightening/loosening fasteners such as screws, bolts, and nuts, and there are a wide variety of types of ratcheting wrenches.

FIG. 8 of the drawings illustrates a conventional ratcheting wrench 1 of the type including a handle 9 and a head 2 in the form of a box end. A gear wheel 3 is rotatably held in the head 2 and includes a through-hole 4 configured to releasably hold a shank of a screwdriver that has a bit 8 for driving a fastener. A retainer 5 such as a C-clip is provided between the gear wheel 3 and the head 2 for rotatably holding the gear wheel 3 in the head 2. An annular groove 6 is defined in an inner periphery delimiting the through-hole 4, and a retainer 7 such as a C-clip is mounted in the annular groove 6 for holding the screwdriver. However, when tightening the fastener, the user has to repeatedly [moving] *move* the handle 9 back and forth many times, which is time-consuming and laborious. Further, the screwdriver shank is apt to displace relative to the gear wheel 3 and thus may be disengaged from the through-hole 4 of the head 2, as there is no member for retaining the screwdriver shank in place. Further, formation of the annular groove 6 for receiving the retainer 7 and formation of the annular groove in the inner periphery of the head 2 for receiving the retainer 5 are difficult and thus increase the cost.

SUMMARY OF THE INVENTION

An object of the present invention is to provide a ratcheting wrench having a dual function retainer for rotatably holding a drive member in a head of the ratcheting wrench and for securely, releasably holding a fastener-driving member received in the drive member.

Another object of the present invention is to provide a ratcheting wrench having a drive member that securely receives a fastener-driving member therein and that has a flange allowing a user to quickly turn the drive member together with the fastener-driving member to quickly drive a fastener and allowing the user to finely turn the drive member and the fastener-driving member when desired.

A ratcheting wrench in accordance with the present invention comprises:

a handle having an end, the end of the handle having a compartment;

a head extending from the end of the handle and having a hole communicated with the compartment of the handle;

a drive member rotatably mounted in the hole of the head, the drive member having an end located outside the head, the drive member including a hole for engaging with a fastener-driving member, allowing joint rotation of the drive member and the fastener-driving member when the drive member is turned, the drive member further including a plurality of teeth on an outer periphery thereof, two annularly spaced slots being defined in the end of the drive member and communicating the hole of the drive member with an exterior, the drive member further including a stop on an inner periphery delimiting the hole of the drive member and opposite to the end of the drive member outside the head, the stop preventing the fastener-driving member from disengaging from the hole of the drive member;

a retainer mounted around the end of the drive member, the retainer having two resilient portions extending into the hole of the drive member via the slots for rotatably holding the drive member in the hole of the head and for securely, releasably holding the fastener-driving member in the hole of the drive member; and a ratcheting mechanism mounted in the compartment of the handle and engaged with the teeth of the drive member, the ratcheting mechanism allowing the handle to selectively move in a ratcheting direction for tightening/loosening a fastener engaged with the fastener-driving member and in a free turning direction reverse to the ratcheting direction in which the fastener engaged with the fastener-driving member is not turned.

In an embodiment of the invention, the retainer is a substantially U-shaped metal wire and includes an intermediate portion and two resilient legs, respectively, extending from two ends of the intermediate portion. Each resilient leg has a rectilinear section that partially extends into the hole of the drive member via an associated one of the slots. Further, the retainer includes at least two exposed sections outside the drive member. Preferably, the slots of the drive member are diametrically opposed to each other. Preferably, the drive member further includes a flange formed on an outer periphery of another end thereof. The flange is located outside the head for manual rotation of the drive member. Preferably, the flange has an embossed outer periphery for easy grasp and turning of the drive member. Preferably, the flange abuts against an end face of the head.

The drive member of the ratcheting wrench in accordance with the present invention can be turned quickly such that the time for tightening/loosening a fastener can be significantly reduced. Further, the fastener-driving member is securely retained in place by the retainer, and the fastener-driving member is prevented from disengaging from the drive member by the stop. Further, the retainer provides two functions, one for rotatably holding the drive member in the hole of the head, and the other for securely, releasably holding the fastener-driving member in the hole of the drive member.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
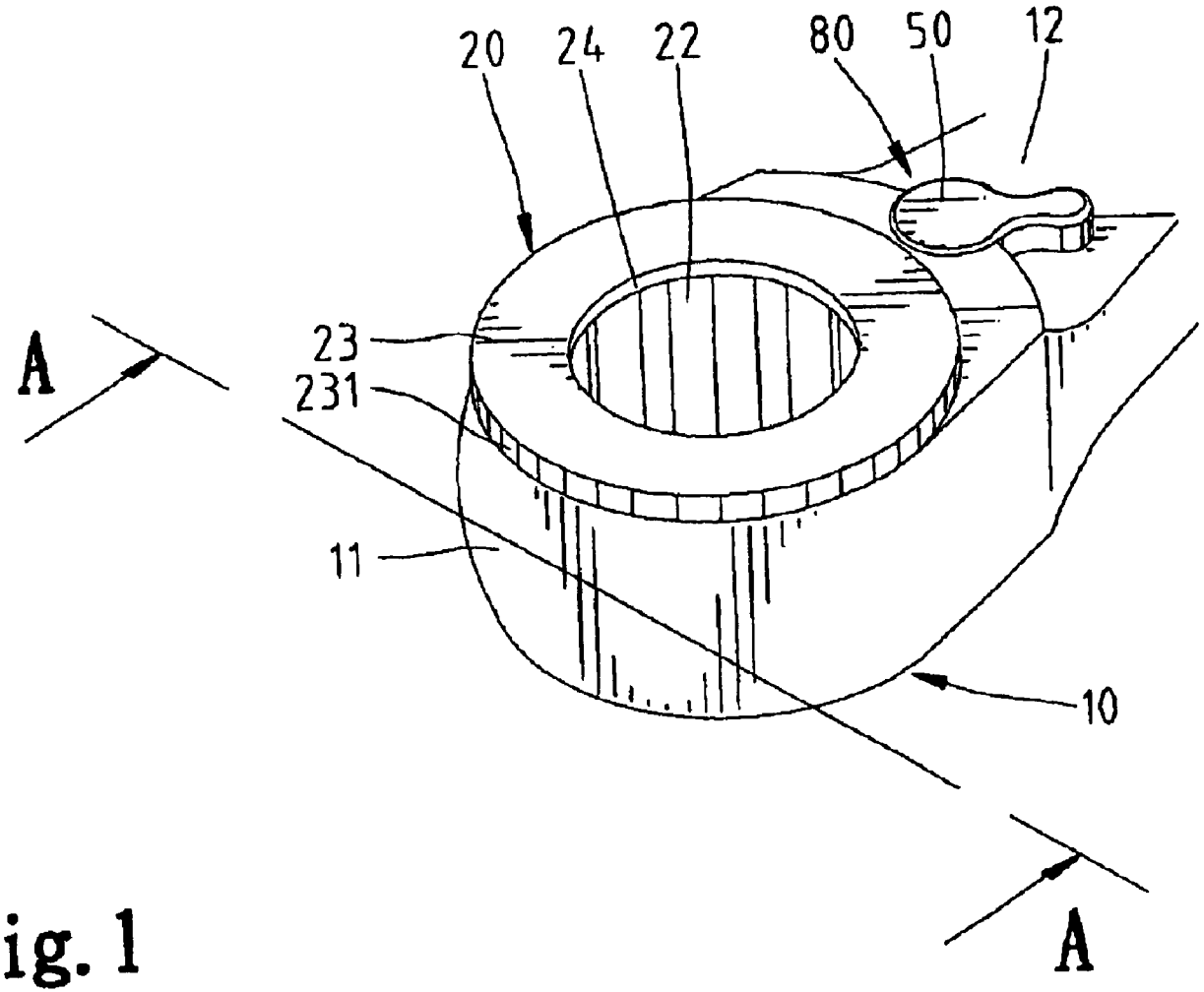
FIG. 1 is a perspective view of a first embodiment of a ratcheting wrench in accordance with the present invention.
Figure 2:
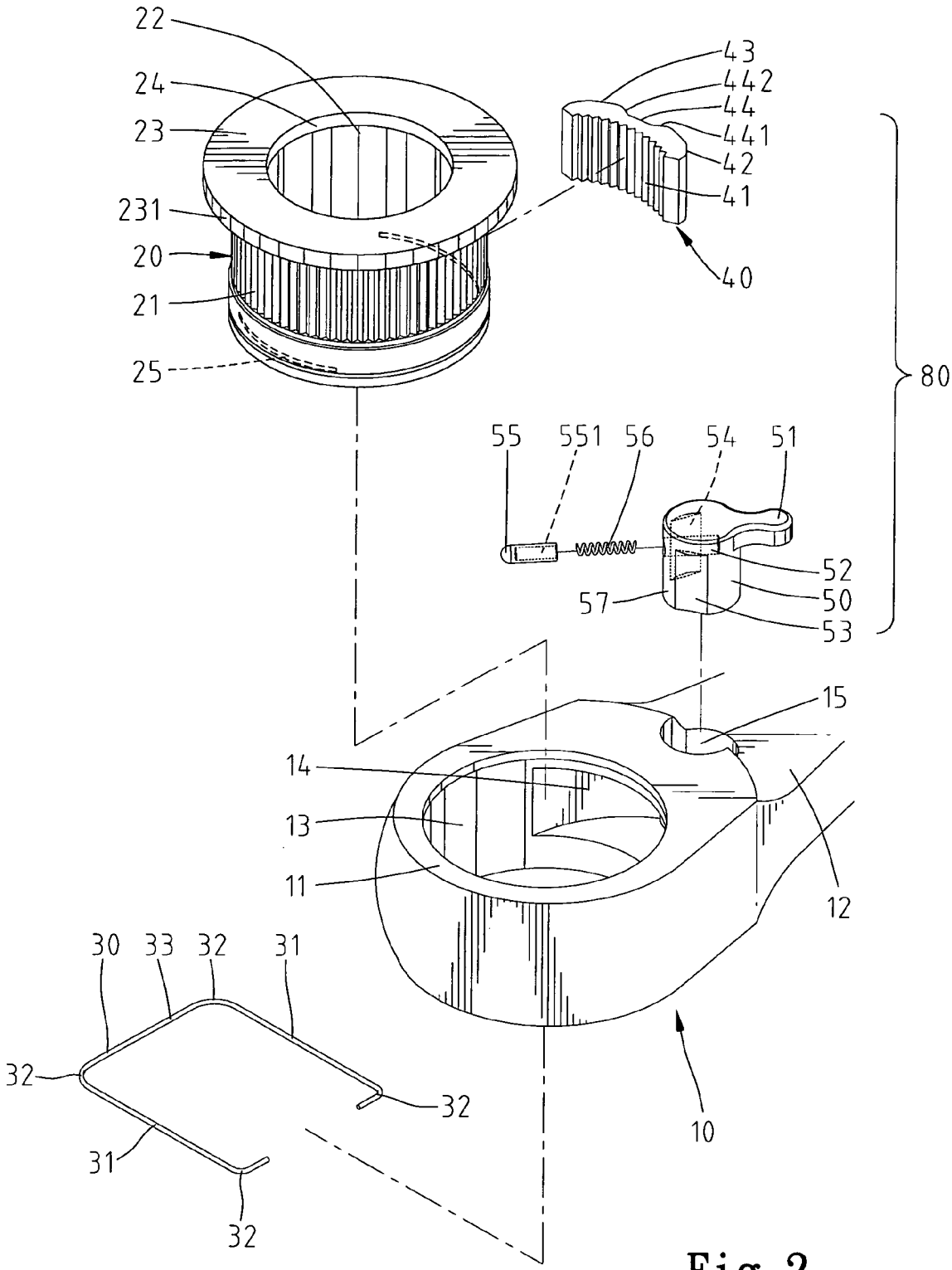
FIG. 2 is an exploded perspective view of the ratcheting wrench in accordance with the present invention.
Figure 3:
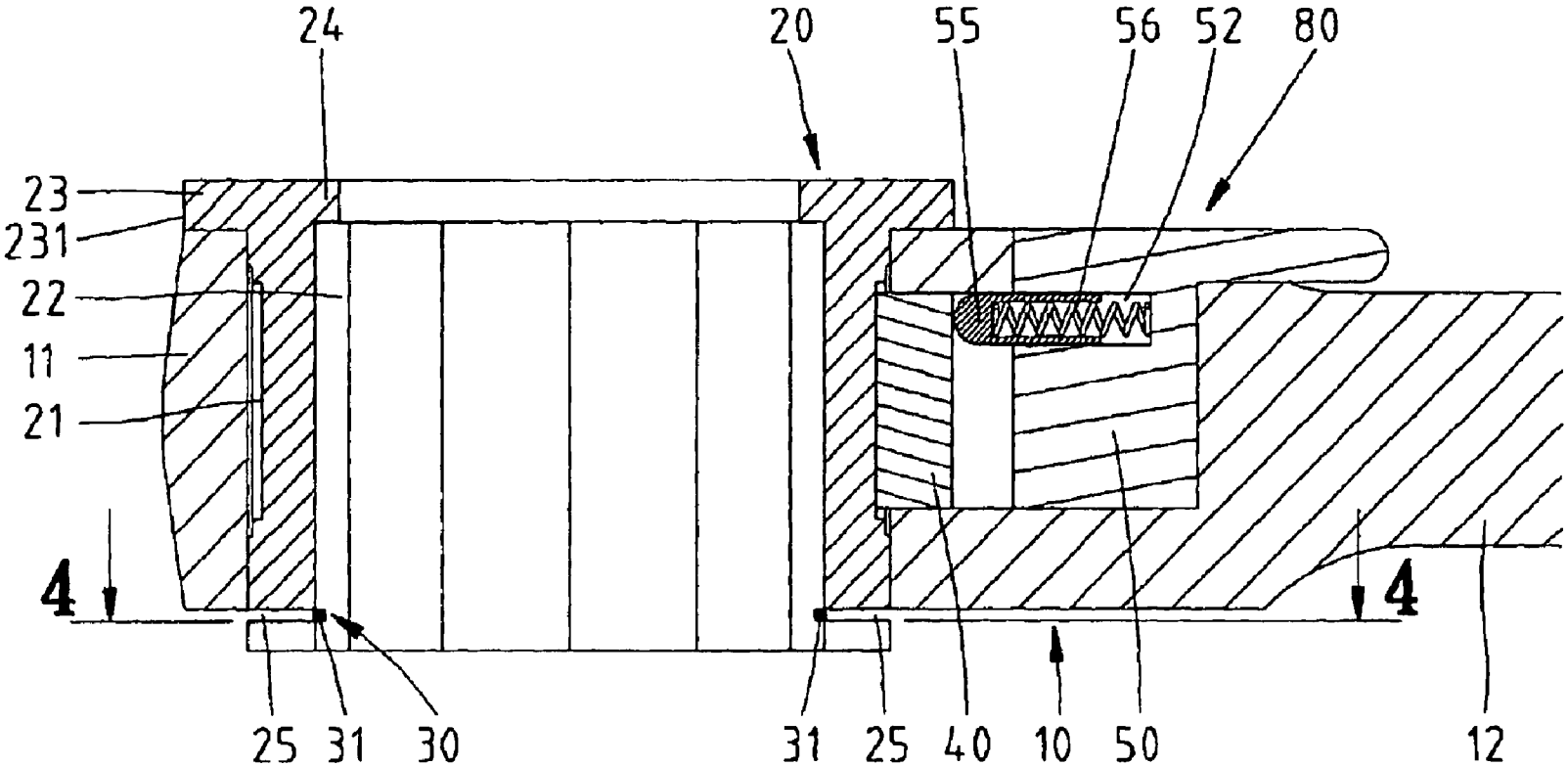
FIG. 3 is a sectional view of the ratcheting wrench in accordance with the present invention.

Referring to FIGS. 1 through 3, a ratcheting wrench in accordance with the present invention is designated by 10 and generally comprises a handle 12 and a head 11 extending from an end of the handle 12. The head 11 is in the form of a box end and includes a hole 13. A compartment 14 is defined in the end of the handle 12 and communicated with the hole 13 of the head 11. In an embodiment of the invention, a ratcheting mechanism *80* is provided in the compartment 14 and includes a pawl 40. An opening 15 is defined in a side (upper side in FIG. 2) of the end of the handle 12 and communicated with the compartment 14.

A drive member 20 is rotatably held in the hole 13 of the head 11. The drive member 20 includes a hole 22 for engaging with a fastener-driving member 60 (e.g., a screwdriver), and a plurality of teeth 21 are defined in an outer periphery of the drive member 20. Two annularly spaced cutouts or slots 25 are defined in an end of the drive member 20 that is located outside the head 11 when the drive member 20 is received in the hole 13 of the head 11. The slots 25 communicate the hole 22 of the drive member 20 with the exterior and are preferably diametrically opposed. The other end of the drive member 20 includes an operative portion that is substantially a disc or flange 23 abutting against an end face of the head 11, as shown in FIG. 3. Preferably, the flange 23 has an embossed outer periphery 231 to increase friction, allowing easy turning of the drive member 20 by grasping and turning the flange 23. Further, still referring to FIG. 3, a stop 24 (e.g., an inner flange) projects inwardly from an end of the inner periphery delimiting the hole 13 of the drive member 20 and is located in a position preferably beyond the hole 13 of the head 11.

Figure 4:
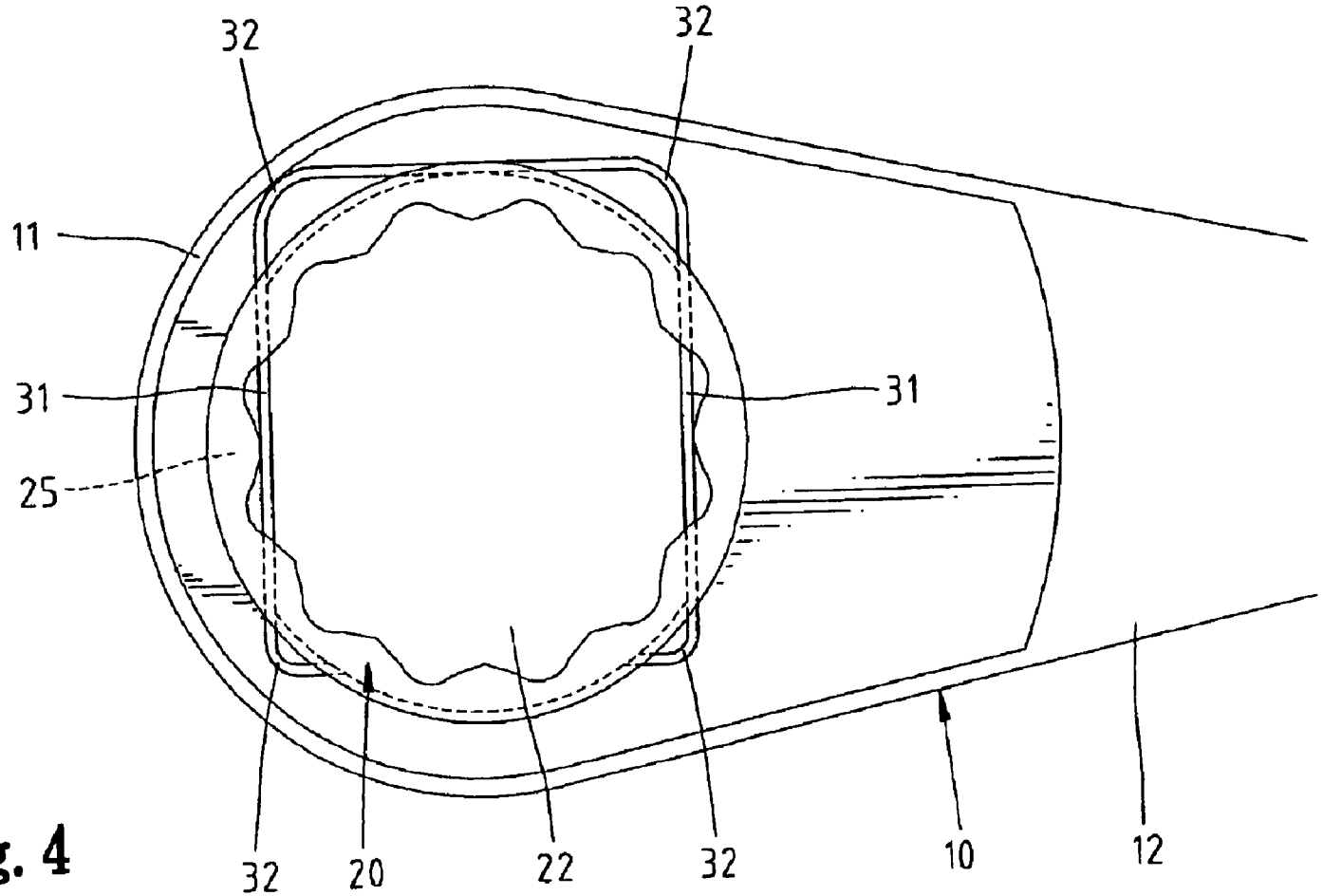
FIG. 4 is a sectional view taken along plane 4-4 in FIG. 3.

A retainer 30 is provided for rotatably holding the drive member 20 in the head 11 and for securely, releasably holding the fastener-driving member 60 in the hole 22 of the drive member 20. In this embodiment, the retainer 30 is a substantially U-shaped metal wire and includes an intermediate portion 33 and two substantially L-shaped resilient legs 31 respectively extending from two ends of the intermediate portion 33. As illustrated in FIG. 3, the retainer 30 is mounted around the lower end of the drive member 20, with the rectilinear longer sections of the resilient legs 31 of the retainer 30 partially protruding into the hole 22 of the drive member 20 via the slots 25. The retainer 30 has four exposed sections 32 outside the drive member 20, best shown in FIG. 4. Thus, the drive member 20 is rotatably retained in the hole 13 of the head 11.

The pawl 40 has a plurality of teeth 41 on a side thereof for releasably engaging with the teeth 21 of the drive member 20. A recessed portion 44 is formed on the other side of the pawl 40 and includes two inclined faces 441 and 442 spaced apart by an intermediate section (not labeled) therebetween. The pawl 40 further includes two abutting faces 42 and 43 for abutting against a wall delimiting the compartment 14 of the handle 12 when proceeding ratcheting operation for tightening/loosening a fastener 70.

Figure 3A:
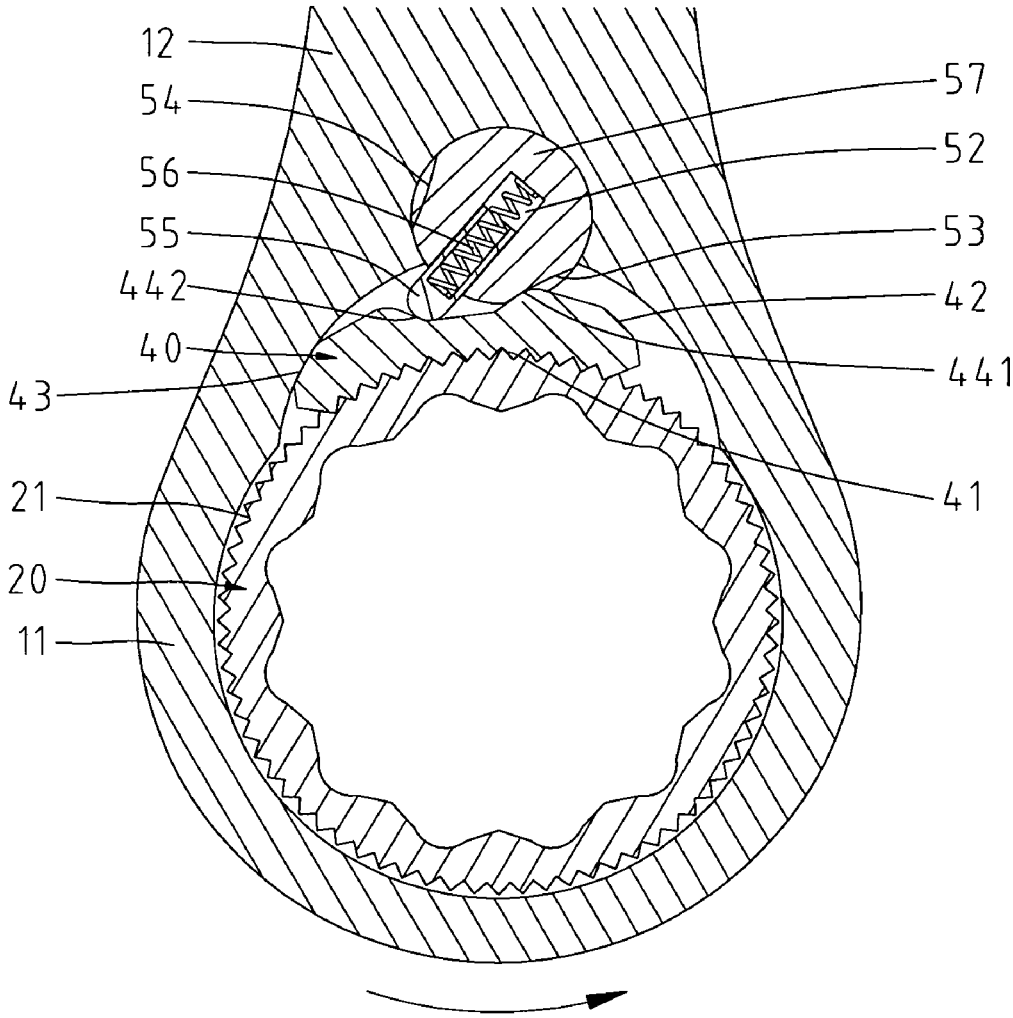
FIG. 3A is a sectional view taken along plane A-A in FIG. 1.

A switch member 50 is provided for controlling position of the pawl 40 in the compartment 14. The switch member 50 includes a substantially cylindrical body 57 that is rotatably received in the compartment 14 and a turn piece 51 that extends outward from an end of the cylindrical body 57 to a position beyond the handle 12 via the opening 15 of the handle 12 for manual operation. The cylindrical body 57 includes a receptacle 52 for receiving an elastic element 56 and a pressing member 55 having a receptacle 551 defined therein. As illustrated in FIG. 3, the pressing member 55 is partially received in the receptacle 52 of the cylindrical body 57, with an end of the elastic element 56 attached to an end wall delimiting the receptacle 52 of the cylindrical body 57 and with the other end of the elastic element 56 attached to an end wall delimiting the receptacle 551 of the pressing member 55. The pressing member 55 is normally biased by the elastic element 56 to press against one of the inclined faces 441 and 442 of the pawl 44 (e.g., the inclined face 442, see FIG. 3A), thereby urging the teeth 41 of the pawl 40 to engage with the teeth 21 of the drive member 20. In this case, as shown in FIG. 3A, the wrench allows ratcheting operation (i.e., tightening or loosening of a fastener) in the counterclockwise direction and allows free rotation in the clockwise direction (i.e., the fastener is not turned when the handle 12 is turned clockwise). It is noted that the abutting face 43 of the pawl 40 abuts a wall delimiting the compartment 14 of the handle 12 when the drive member 20 is turned in the ratcheting direction.

Figure 3B:
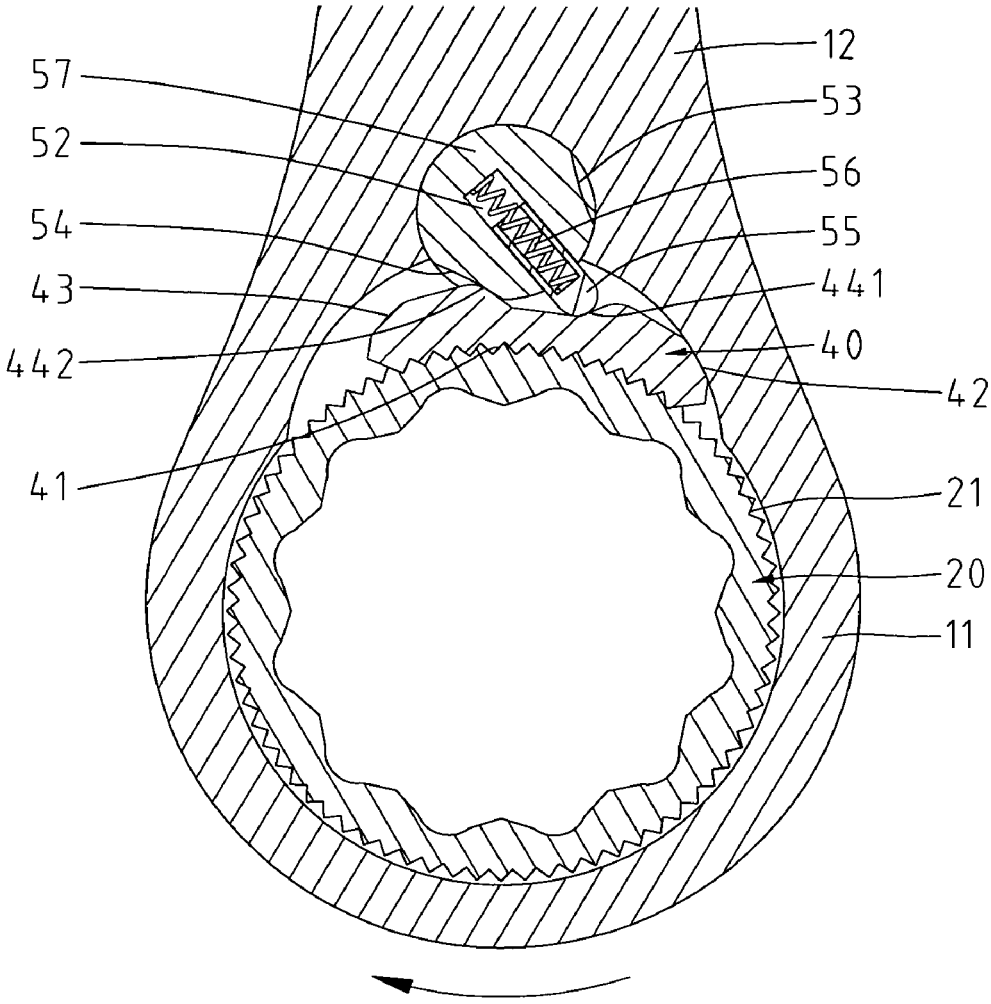
FIG. 3B is a sectional view similar to FIG. 3A, illustrating operation of the ratcheting wrench in a reverse direction.

When the turn piece 51 of the switch member 50 is turned, the pressing member 55 is moved from the inclined face 442 to the other inclined face 441. The teeth 41 of the pawl 40 engage with the teeth 21 of the drive member 20 under the action of the elastic element 56. In this case, the wrench allows ratcheting operation in the clockwise direction and allows free rotation in the counterclockwise direction (i.e., the fastener is not turned when the handle 12 is turned counterclockwise). It is noted that the abutting face 42 of the pawl 40 abuts the wall delimiting the compartment 14 of the handle 12 when the drive member 20 is turned in the ratcheting direction. The cylindrical body 57 further includes two engaging faces or portions 53 and 54 one of which presses against an associated one of the inclined faces 441 and 442 of the pawl 44, as shown in FIGS. 3A and 3B. This provides a more reliable support for the pawl 40.

Figure 5:
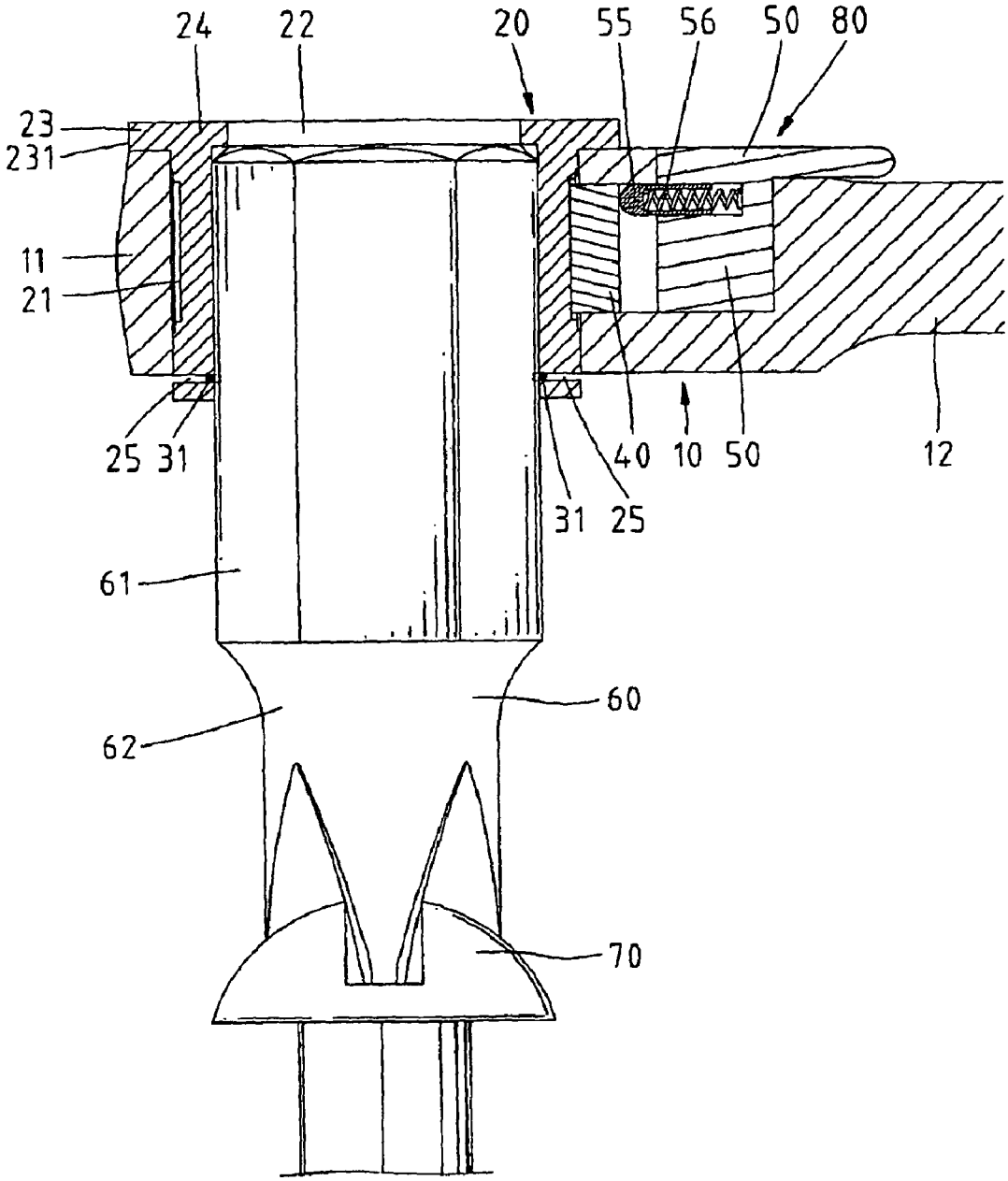
FIG. 5 is a sectional view similar to FIG. 3, illustrating use of the ratcheting wrench in accordance with the present invention.
Figure 6:
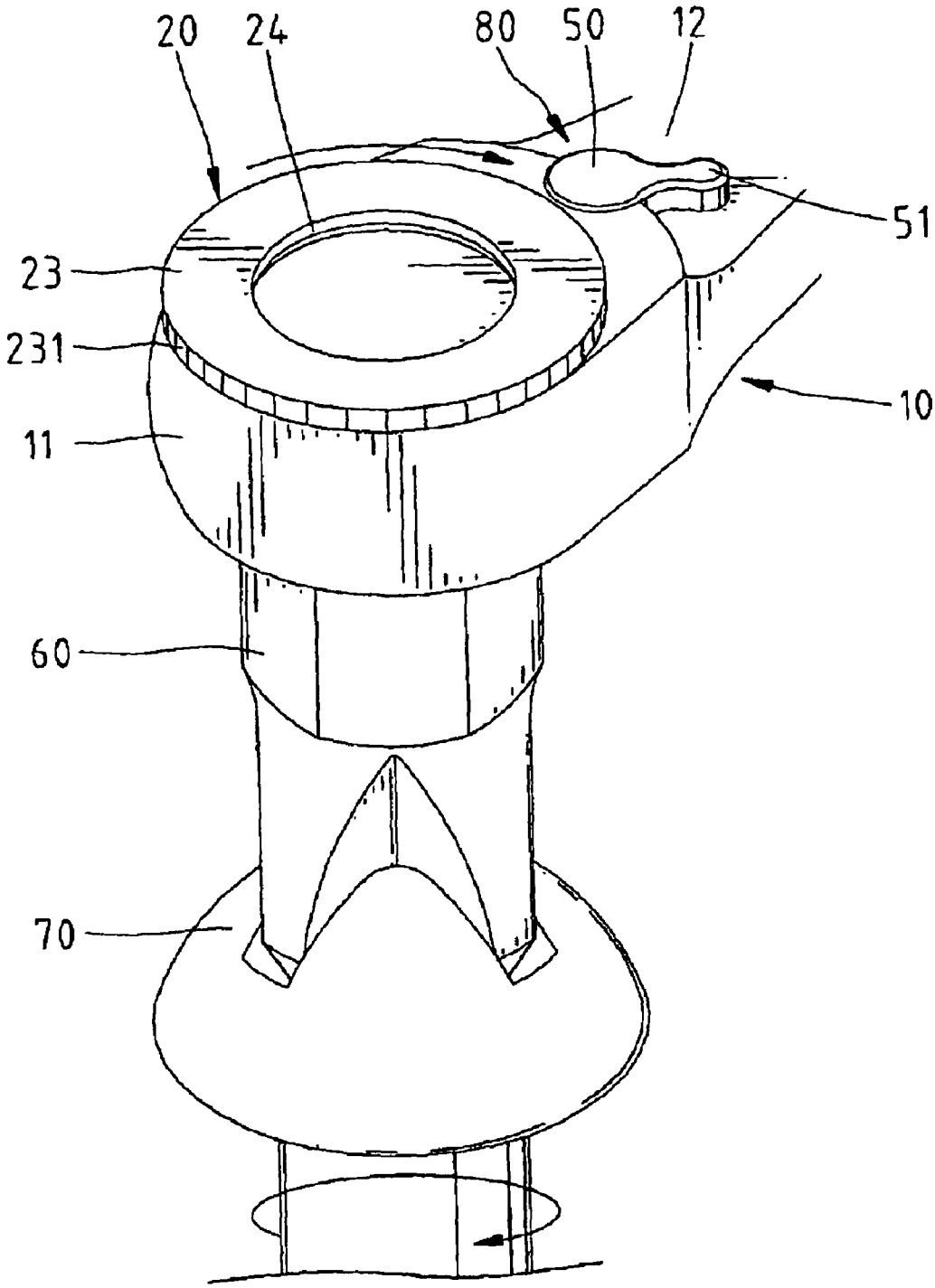
FIG. 6 is a perspective view illustrating quick tightening operation of the ratcheting wrench in accordance with the present invention.

Referring to FIG. 5, in use, a portion of a fastener-driving member, e.g., a shank 61 of a screwdriver 60 is inserted into the drive member 20 until an end face of the shank 61 is stopped by the stop 24. The shank 61 of the screwdriver 60 is retained in the engaging [portion] *hole* 22 of the drive member 20 by the legs 31 of the retainer 30 that extend into the hole 22 of the drive member 20 through the slots 25 in the drive member 20. When tightening a fastener 70, referring to FIG. 6, the user may grasp and turn the flange 23 rapidly, which causes rapid rotation of the drive member 20 and the shank 61 of the screwdriver 60. Thus, the fastener 70 is quickly turned in the tightening direction until a relatively large force is required for securely tightening the fastener 70. This is because the force required for turning the drive member 20 is smaller at the first stage of tightening the fastener 70. Another reason allowing rapid turning of the drive member 20 is that the flange 23 has an outer diameter that is much smaller when compared to the arm of force for turning the handle 12. Thus, the time for turning the fastener 70 to an almost tightened position is much shorter when compared to the use of the handle 12.

Figure 7:
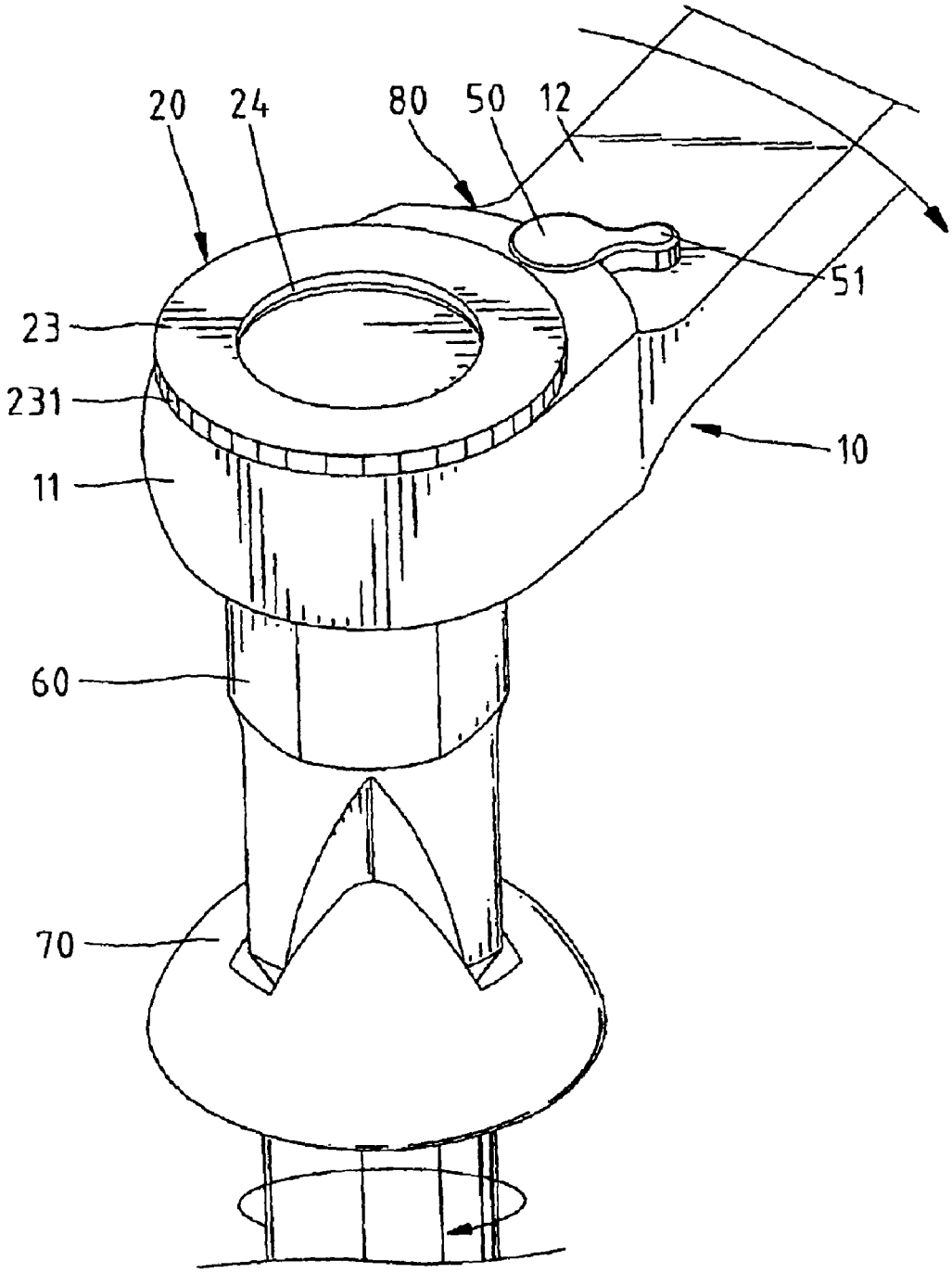
FIG. 7 is a perspective view illustrating final tightening operation procedure of the ratcheting wrench in accordance with the present invention.
Figure 8:
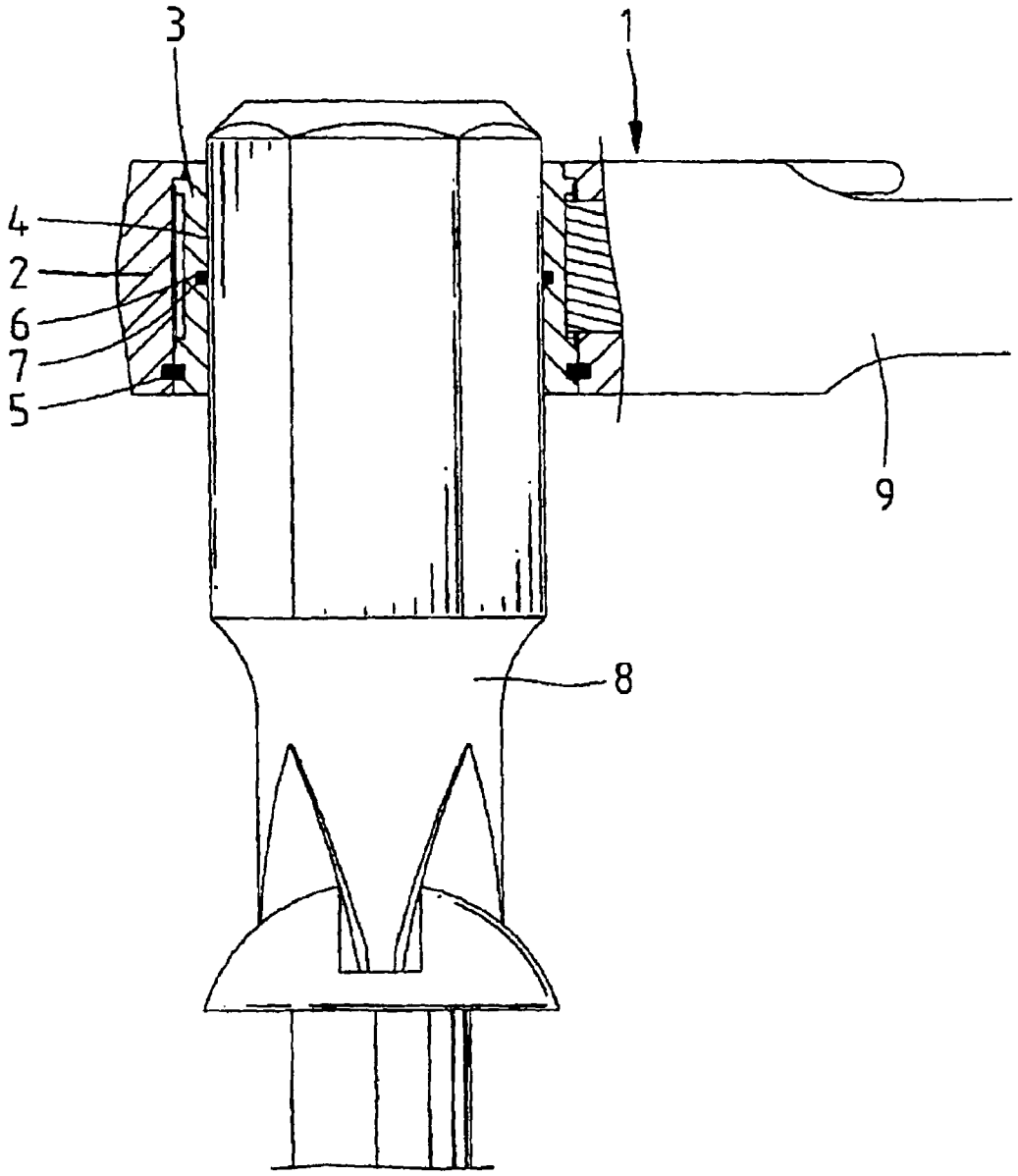
Fig. 8 PRIOR ART
FIG. 8 is a schematic side view, partly sectioned, of a conventional ratcheting wrench.

Referring to FIG. 7, when the fastener 70 is turned to the almost tightened position, the user may use the handle 12 to proceed with firm, reliable tightening of the fastener 70, as the arm of force is greater. Thus, the fastener 70 can be tightened in a rapid and reliable manner. Of course, the time for loosening the fastener 70 can be shortened. It can be achieved by firstly loosening the fastener 70 by turning the handle 12 to a slightly loosened position and then loosening the fastener 70 by turning the flange 23 of the drive member 20 with the fingers of the user. Further, the user may manually turn the flange 23 of the drive member 20 through a relatively small angle to thereby finely adjust the angular position of the drive member 20 and the shank 61 of the screwdriver 60. This allows the user to finely adjust the tightening force for the fastener 70.

It is noted that the ratcheting mechanism and the switch member 50 are not limited to those disclosed herein and shown in the accompanying drawings. They can be replaced with any other structures allowing reversible or irreversible ratcheting operation. The "fastener-driving member" as used herein is not limited to the whole tool. Namely, the "fastener-driving member" may be a whole screwdriver or the like, a screwdriver shank with a bit, or a screwdriver bit. Of course, other member that serves the function of driving fasteners can be used as the fastener-driving member without departing from the scope of the invention.

According to the above description, it is appreciated that the drive member 20 of the ratcheting wrench in accordance with the present invention can be turned quickly such that the time for tightening/loosening a fastener can be significantly reduced. Further, the tightening force for the fastener can be finely adjusted. These advantages are provided by the flange 23 on an end of the drive member 20. Further, the fastener-driving member 60 is securely retained in place by the retainer 30, and the fastener-driving member 60 is prevented from disengaging from the drive member 20 by a stop 24. Further, sliding movement of the shank 61 of the screwdriver 60 into the hole 22 of the drive member 20 is smoother when compared to conventional designs. Further, the retainer 30 provides two functions, one for rotatably holding the drive member 20 in the hole 13 of the head 11, and the other for securely, releasably holding the fastener-driving member 60 in the hole 22 of the drive member 20. The overall cost for manufacturing the ratcheting wrench in accordance with the present invention is lower than conventional designs, as only one retainer is used and the assembling procedure is easier for the ratcheting wrench in accordance with the present invention.

Although the invention has been explained in relation to its preferred embodiment, it is to be understood that many other possible modifications and variations can be made without departing from the scope of the invention as hereinafter claimed.

What is claimed is:

1. A ratcheting wrench comprising:

a handle having an end, the end of the handle having a compartment;

a head extending from the end of the handle and having a hole communicated with the compartment of the handle;

a drive member rotatably mounted in the hole of the head, the drive member having an end located outside the head, the drive member including a hole for engaging with a fastener-driving member, allowing joint rotation of the drive member and the fastener-driving member when the drive member is turned, the drive member further including a plurality of teeth on an outer periphery thereof, two annularly spaced slots being defined in the end of the drive member for communicating the hole of the drive member with an exterior, the drive member further including a stop on an inner periphery delimiting the hole of the drive member and opposite to the end of the drive member outside the head, the stop preventing the fastener-driving member from disengaging from the hole of the drive member;

a retainer mounted around the end of the drive member, the retainer having two resilient portions extending into the hole of the drive member via the slots for rotatably holding the drive member in the hole of the head and for securely, releasably holding the fastener-driving member in the hole of the drive member; and a ratcheting mechanism mounted in the compartment of the handle and engaged with the teeth of the drive member, the ratcheting mechanism allowing the handle to selectively move in a ratcheting direction for tightening/loosening a fastener engaged with the fastener-driving member and in a free turning direction reverse to the ratcheting direction in which the fastener engaged with the fastener-driving member is not turned.

2. The ratcheting wrench as claimed in claim 1, wherein the retainer is a substantially U-shaped metal wire and includes an intermediate portion and two resilient legs respectively extending from two ends of the intermediate portion.

3. The ratcheting wrench as claimed in claim 2, wherein each said resilient leg has a rectilinear section that partially extends into the hole of the drive member via an associated one of the slots.

4. The ratcheting wrench as claimed in claim 2, wherein the retainer includes at least two exposed sections outside the drive member.

5. The ratcheting wrench as claimed in claim 1, wherein the slots are diametrically opposed to each other.

6. The ratcheting wrench as claimed in claim 1, wherein the drive member further includes a flange formed on an outer periphery of another end thereof, the flange being located outside the head for manual rotation of the drive member.

7. The ratcheting [tool] *wrench* as claimed in claim 6, wherein the flange has an embossed outer periphery.

8. The ratcheting wrench as claimed in claim 6, wherein the flange abuts against an end face of the head.

9. The ratcheting wrench as claimed in claim 1, wherein the end of the handle has an opening defined in a side thereof and communicated with the compartment of the handle, the ratcheting mechanism including a pawl slidably mounted in the compartment of the handle and a switch member rotatably mounted in the compartment of the handle and operably connected to the pawl such that rotation of the switch member causes sliding movement of the pawl in the compartment between two positions, the switch member having a turn piece extending to a position outside the handle via the opening of the handle, allowing manual rotation of the switch member to thereby move the pawl between the two positions for changing the ratcheting direction of the handle.

10. The ratcheting wrench as claimed in claim 9, wherein the pawl includes a first, toothed side for engaging with the teeth of the drive member, the pawl further including a second side having a recessed portion, the recessed portion having two inclined faces that are spaced apart by an intermediate section therebetween, the pawl further including two abutting faces for selectively abutting against a wall delimiting the compartment of the handle when the drive member is turned in the ratcheting direction.

11. The ratcheting wrench as claimed in claim 10, wherein the switch member includes a cylindrical body with the turn piece extending outward from an end of the cylindrical body, a receptacle being defined in the cylindrical body, an elastic element and a pressing member being received in the receptacle of the cylindrical body, the pressing member being biased by the elastic element to selectively press against one of the inclined faces of the pawl.

12. The ratcheting wrench as claimed in claim 11, wherein the cylindrical body further includes two engaging portions one of which presses against an associated one of the inclined faces of the pawl to thereby provide a more reliable support for the pawl when the drive member is turned in the ratcheting direction.

*13. A ratcheting wrench comprising:*

*a handle having an end, the end of the handle having a compartment;*

*a head extending from the end of the handle and having a hole communicated with the compartment of the handle;*

*a drive member rotatably mounted in the hole of the head, the drive member having an end located outside the head, the drive member including a hole for engaging with a fastener-driving member, allowing joint rotation of the drive member and the fastener-driving member when the drive member is turned, the drive member further including a plurality of teeth on an outer periphery thereof, two annularly spaced slots being defined in the end of the drive member for communicating the hole of the drive member with an exterior;*

*a retainer mounted around the end of the drive member, the retainer having two resilient portions extending into the hole of the drive member via the slots for rotatably holding the drive member in the hole of the head and for securely, releasably holding the fastener-driving member in the hole of the drive member; and*

*a ratcheting mechanism mounted in the compartment of the handle and engaged with the teeth of the drive member, the ratcheting mechanism allowing the handle to selectively move in a ratcheting direction for tightening/loosening a fastener engaged with the fastener-driving member and in a free turning direction reverse to the ratcheting direction in which the fastener engaged with the fastener-driving member is not turned.*

*14. The ratcheting wrench as claimed in claim 13, wherein the retainer is a substantially U-shaped metal wire and includes an intermediate portion and two resilient legs respectively extending from two ends of the intermediate portion.*

*15. The ratcheting wrench as claimed in claim 14, wherein each said resilient leg has a rectilinear section that partially extends into the hole of the drive member via an associated one of the slots.*

*16. The ratcheting wrench as claimed in claim 14, wherein the retainer includes at least two exposed sections outside the drive member.*

*17. The ratcheting wrench as claimed in claim 13, wherein the slots are diametrically opposed to each other.*

*18. The ratcheting wrench as claimed in claim 13, wherein the drive member further includes a flange formed on an outer periphery of another end thereof, the flange being located outside the head for manual rotation of the drive member.*

*19. The ratcheting wrench as claimed in claim 18, wherein the flange has an embossed outer periphery.*

*20. The ratcheting wrench as claimed in claim 13, wherein the end of the handle has an opening defined in a side thereof and communicated with the compartment of the handle, the ratcheting mechanism including a pawl slidably mounted in the compartment of the handle and a switch member rotatably mounted in the compartment of the handle and operably connected to the pawl such that rotation of the switch member causes sliding movement of the pawl in the compartment between two positions, the switch member having a turn piece extending to a position outside the handle via the opening of the handle, allowing manual rotation of the switch member to thereby move the pawl between the two positions for changing the ratcheting direction of the handle.*

*21. A ratcheting wrench comprising:*

*a handle having an end, the end of the handle having a compartment;*

*a head extending from the end of the handle and having a hole communicated with the compartment of the handle;*

*a drive member rotatably mounted in the hole of the head, the drive member having an end located outside the head, the drive member including a hole delimited by an inner periphery for engaging with a fastener-driving member and having multiple corners, allowing joint rotation of the drive member and the fastener-driving member when the drive member is turned, the drive member further including a plurality of teeth on an outer periphery thereof, at least a first slot being defined in the end of the drive member for communicating the hole of the drive member with an exterior;*

*a retainer mounted around the end of the drive member, the retainer having at least a first resilient portion extending into and across at least one corner of the hole of the drive member via the at least first slot for rotatably holding the drive member in the hole of the head and for securely, releasably holding the fastener-driving member in the hole of the drive member; and*

*a ratcheting mechanism mounted in the compartment of the handle and engaged with the teeth of the drive member, the ratcheting mechanism allowing the handle to selectively move in a ratcheting direction for tightening/loosening a fastener engaged with the fastener-driving member and in a free turning direction reverse to the ratcheting direction in which the fastener engaged with the fastener-driving member is not turned.*

*22. The ratcheting wrench as claimed in claim 21, wherein a second slot is defined in the end of the drive member annularly spaced from the first slot, wherein the retainer has a second resilient portion extending into the second slot.*

*23. The ratcheting wrench as claimed in claim 22, wherein the drive member is rotatably mounted in the hole of the head about an axis, and wherein the second slot is tangential to the axis and communicates the hole of the drive member with the exterior.*

* * * * *

UNITED STATES PATENT AND TRADEMARK OFFICE

CERTIFICATE OF CORRECTION

PATENT NO. : RE42,816 E
APPLICATION NO. : 11/478544
DATED : October 11, 2011
INVENTOR(S) : Hu It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*